US012651878B1

(12) United States Patent
Wang

(10) Patent No.: US 12,651,878 B1
(45) Date of Patent: Jun. 9, 2026

(54) PIN COMBINED STRUCTURE FOR POWER CONVERTER WITH SMALLER VOLUME

(71) Applicant: GUANGDONG WORLDPLUG TECHNOLOGY CO., LTD, Huizhou City (CN)

(72) Inventor: Feng Wang, Huizhou City (CN)

(73) Assignee: GUANGDONG WORLDPLUG TECHNOLOGY CO., LTD, Huizhou City (CN)

( * ) Notice: Subject to any disclaimer, the term of this patent is extended or adjusted under 35 U.S.C. 154(b) by 0 days.

(21) Appl. No.: 19/254,976

(22) Filed: Jun. 30, 2025

(30) Foreign Application Priority Data

Jan. 24, 2025 (CN) ........................ 202520171962.7
Mar. 4, 2025 (CN) ........................ 202510247689.6

(51) Int. Cl.
*H01R 31/06* (2006.01)

(52) U.S. Cl.
CPC .................................. *H01R 31/06* (2013.01)

(58) Field of Classification Search
CPC ............................... H01R 31/06; H01R 13/68
USPC ................................................ 439/170–175
See application file for complete search history.

(56) References Cited

U.S. PATENT DOCUMENTS

| | | | | |
|---|---|---|---|---|
| 10,673,192 B1 * | 6/2020 | Liu | | H01R 31/06 |
| 2018/0062331 A1 * | 3/2018 | Finn | | H01R 13/514 |
| 2020/0287304 A1 * | 9/2020 | Wu | | H01R 12/52 |
| 2021/0376546 A1 * | 12/2021 | Barnett | | H01R 27/00 |

FOREIGN PATENT DOCUMENTS

| | | | | | |
|---|---|---|---|---|---|
| AU | 2017353337 A1 | * | 5/2019 | | H01R 27/00 |
| AU | 2023216747 B1 | * | 1/2025 | | H01R 13/502 |
| CN | 109713538 A | * | 5/2019 | | |
| CN | 220544428 U | * | 2/2024 | | |
| CN | 118281625 A | * | 7/2024 | | H01R 13/512 |
| CN | 109713538 B | * | 9/2024 | | |

* cited by examiner

*Primary Examiner* — Abdullah A Riyami
*Assistant Examiner* — Thang H Nguyen
(74) *Attorney, Agent, or Firm* — Cooper Legal Group, LLC

(57) ABSTRACT

The present invention discloses a pin combined structure for a power converter with a smaller volume. The present invention overlaps the space occupied by the American standard pin assembly, the European standard pin assembly and the British standard pin assembly, reduces the overall length of the power converter, reduces the overall volume of the power converter, and is more convenient for a user to carry on a trip.

3 Claims, 6 Drawing Sheets

PIN COMBINED STRUCTURE FOR POWER CONVERTER WITH SMALLER VOLUME

CROSS-REFERENCE TO RELATED APPLICATIONS

The application claims priority of Chinese patent application 202510247689.6, filed on Mar. 4, 2025, and Chinese patent application 202520171962.7, filed on Jan. 24, 2025. Chinese patent application 202510247689.6 and Chinese patent application 202520171962.7 are incorporated herein by reference in their entireties.

TECHNICAL FIELD

The present invention relates to the field of power converters and, more particularly, to a pin combined structure for a power converter with a smaller volume.

BACKGROUND ART

Due to different specifications of plug and socket in different countries, they are not universal. If it is necessary to insert the plug into the socket with mismatched specifications, it is necessary to have a power converter. The power converter is a converting tool that is used by inserting the power converter into a target socket and then inserting a target plug into a mating socket hole in the power converter to effect converting. The advent of power converters has increased the ease with which people can live outside, especially when traveling across the country, without worrying about the inconvenience of having a portable electronic device with a plug that does not fit into a local power socket.

In conventional power converters, the pins are typically in a fixed, extended state. However, for a power converter including a plurality of pins, it is necessary to provide the plurality of pins, and to separate the pins from each other, so as to prevent the plurality of pins from interfering with each other in use. However, such a separate arrangement results in an overall bulky power converter, which is inconvenient to be carried on a trip and affects the experience of use.

SUMMARY OF THE INVENTION

In view of the above-mentioned deficiencies, it is an object of the present invention to provide a pin combined structure for a power converter with a smaller volume, which overlaps the space occupied by the American standard pin assembly, the European standard pin assembly and the British standard pin assembly, reduces the overall length of the power converter, reduces the overall volume of the power converter, and is more convenient for a user to carry on a trip.

The technical solution adopted by the present invention to achieve the above-mentioned object is as follows.

A pin combined structure for a power converter with a smaller volume comprises a European standard pin assembly and a British standard pin assembly provided in the power converter. The British standard pin assembly comprises a British standard shared slider slidably provided in the power converter, and a British standard ground wire pin provided on the British standard shared slider; the British standard shared slider is integrally U-shaped, and an avoidance space is formed therein; the European standard pin assembly comprises a European standard shared slider slidably provided in the avoidance space, and a European standard plug bush matched with the European standard shared slider and slidably provided in the avoidance space, wherein the European standard plug bush is formed with a first European standard ground wire avoidance groove recessed inwards and matched with the British standard ground wire pin; and the British standard ground wire pin moves along the first British standard ground wire avoidance groove.

As a further improvement of the present invention, a second British standard ground wire pin which is inwardly recessed and matched with the British standard ground wire pin is formed in the European standard shared slider; and the British standard ground wire pins are movable on the first British standard ground wire avoidance groove and the second British standard ground wire avoidance groove successively.

As a further improvement of the present invention, there is also included an American standard pin assembly slidably provided in the avoidance space; the American standard pin assembly comprises an American standard shared slider slidably provided in the avoidance space, an American standard live wire pin provided on the American standard shared slider, and an American standard neutral wire pin provided on the American standard shared slider.

As a further improvement of the present invention, the American standard pin assembly further comprises an American standard live wire conducting strip provided on the American standard shared slider, protruding outwards and electrically connected to the American standard live wire pin, and an American standard neutral wire conducting strip provided on the American standard shared slider, protruding outwards and electrically connected to the American standard neutral wire pin; the British standard shared slider is formed with an inwardly recessed American standard conducting strip avoidance groove, which allows the American standard live wire conducting strip and the American standard neutral wire conducting strip to move when driven by the American standard shared slider.

As a further improvement of the present invention, a British standard pin operating rod protruding outside the power converter is provided on the British standard shared slider; an American standard pin operating rod protruding outside the power converter is provided on the American standard shared slider; and a European standard pin operating rod protruding outside the power converter is provided on the European standard shared slider; and the British standard pin operating rod, the American standard pin operating rod and the European standard pin operating rod are provided alternately.

As a further improvement of the present invention, the initial height of the European standard pin operating rod is higher than the initial height of the British standard pin operating rod and the American standard pin operating rod.

As a further improvement of the present invention, the British standard ground wire pin is provided on one end of the U-shaped structure of the British standard shared slider; and the British standard pin assembly further comprises a British standard neutral wire pin provided on a side of the other end of the U-shaped structure of the British standard shared slider, and a British standard live wire pin provided on the other side of the other end of the U-shaped structure of the British standard shared slider.

As a further improvement of the present invention, the European standard pin assembly also includes a European standard live wire pin provided on the European standard shared slider, and a European standard neutral wire pin provided on the European standard shared slider.

As a further improvement of the present invention, it further comprises a safety member provided in the power converter; a British standard safety avoidance portion that is recessed in an avoidance space direction and that yields the safety member is formed on the British standard shared slider.

As a further improvement of the present invention, it further comprises a socket neutral wire conducting strip provided in the power converter, wherein an American standard conductive avoidance portion which is inwardly recessed and provides a relief for the socket neutral wire conducting strip is formed on the American standard shared slider.

The invention has the following beneficial effects.

(1) The present pin combined structure for the power converter is provided, including a European standard pin assembly and a British standard pin assembly provided in the power converter. The British standard pin assembly comprises a British standard shared slider slidably provided in the power converter, and a British standard ground wire pin provided on the British standard shared slider; the British standard shared slider is integrally U-shaped, and an avoidance space is formed therein; the European standard pin assembly comprises a European standard shared slider slidably provided in the avoidance space, and a European standard plug bush matched with the European standard shared slider and slidably provided in the avoidance space, wherein the European standard plug bush is formed with a first European standard ground wire avoidance groove recessed inwards and matched with the British standard ground wire pin; and the British standard ground wire pin moves along the first British standard ground wire avoidance groove. By arranging the European standard pin assembly to slide in the avoidance space, and the British standard ground wire pin moving along the first British standard ground wire avoidance groove, the space occupied by the European standard pin assembly and the space occupied by the British standard pin assembly coincide, the space in the power converter is saved, the overall length of the power converter is reduced, and the overall volume of the power converter is reduced, which is more convenient for the user to carry it on the trip.

(2) By providing an American standard pin assembly in the power converter, the American standard pin assembly comprises an American standard shared slider slidably provided in the avoidance space, an American standard live wire pin provided on the American standard shared slider, and an American standard neutral wire pin provided on the American standard shared slider. The American standard pin assembly is movable in the avoidance space, so that the space occupied by the American standard pin assembly. Thus, the space occupied by the American standard pin assembly and the space occupied by the American standard pin assembly coincide, reducing the overall length of the power converter and reducing the overall volume of the power converter, which is more convenient for the user to carry it on the trip.

(3) By providing a British standard pin operating rod protruding outside the power converter is provided on the British standard shared slider; an American standard pin operating rod protruding outside the power converter is provided on the American standard shared slider; and a European standard pin operating rod protruding outside the power converter is provided on the European standard shared slider; and the British standard pin operating rod, the American standard pin operating rod and the European standard pin operating rod are provided alternately, and the alternate configuration thereof facilitates a user to select different pin assemblies for use, effectively avoiding a case where a plurality of operating rods are pressed once.

The above is an overview of the technical solutions of the invention, and the invention is further explained in combination with the accompanying drawings and the detailed description.

Figure 1:
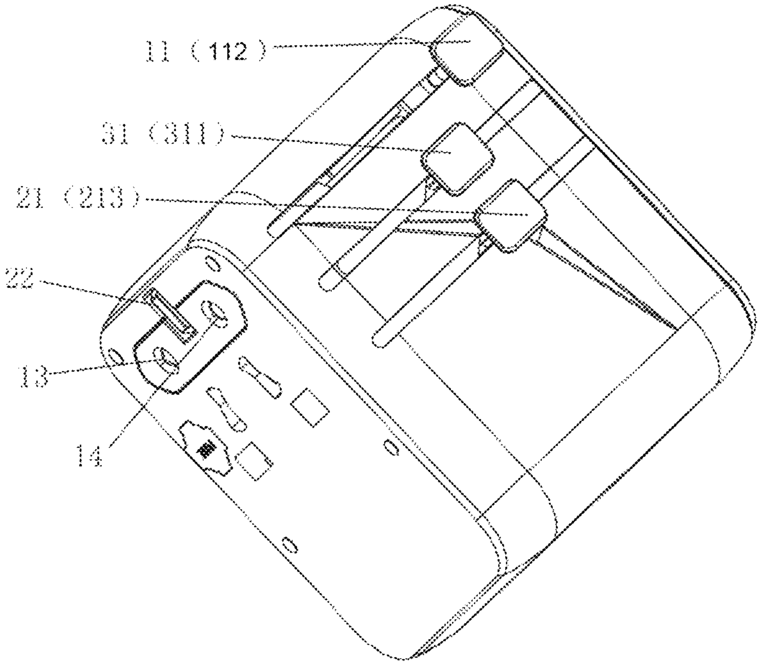
FIG. 1 is an overall schematic view of a power converter.

In the drawings, 1, European standard pin assembly; 11, European standard shared slider; 111, second British standard ground wire avoidance groove; 112, European standard pin operating rod; 12, European standard plug bush; 121, first European standard ground wire avoidance groove; 13, European standard live wire pin; 14, European standard neutral wire pin; 2, British standard pin assembly; 21, British standard shared slider; 211, avoidance space; 212, American standard conducting strip avoidance groove; 213, British standard pin operating rod; 214, British standard safety avoidance portion; 22, British standard ground wire pin; 23, British standard live wire pin; 24, British standard neutral wire pin; 3, American standard pin assembly; 31, American standard shared slider; 311, American standard pin operating rod; 312, American standard conductive avoidance portion; 32, American standard live wire pin; 33, American standard neutral wire pin; 34, American standard live wire conducting strip; 35, American standard neutral wire conducting strip; 4, safety member; 5, socket neutral wire conducting strip.

DETAILED DESCRIPTION

In order to further clarify the technical means and effects adopted by the present invention to achieve the intended purpose, a detailed description of specific embodiments of the present invention will be given below with reference to the accompanying drawings and preferred embodiments.

In the description of the present invention, it should be understood that the directional or positional relationships indicated by the terms “length”, “width”, “up”, “down”, “front”, “back”, “left”, “right” and “vertical”, “level”, “top”, “bottom”, “inside”, “outside”, “side” and the like are based on the directional or positional relationships shown in the drawings. It is merely for the purpose of describing the present application and simplifying the description, and is not intended to indicate or imply that a particular orientation, configuration and operation of the referenced device or element is required and should not be construed as limiting the scope of the present invention.

Furthermore, the terms “first” and “second” are used for descriptive purposes only and are not to be construed as indicating or implying relative importance or implicitly indicating the number of technical features indicated. Thus, a feature defined by “first” and “second” and so on may explicitly or implicitly include one or more such features. In the description of the present invention, the meaning of “a plurality” is two or more, unless specifically limited otherwise.

In the present invention, unless expressly stated or limited otherwise, the terms “mounted”, “connected”, “connecting”, “fixed”, and the like are to be interpreted broadly, e.g., either fixedly or removably, or integrally modularization. It may be a mechanical connection or an electrical connection. It may be a direct connection or indirect connection by an intermediary. It may be a communication between two elements, or may be in an interactive relationship between two elements. For those of ordinary skill in the art, the specific meanings of the above terms in the present invention can be understood according to specific circumstances.

Referring to FIGS. 1 to 8, an embodiment of the present invention provides a pin combined structure for a power converter with a smaller volume comprising a European standard pin assembly 1 and a British standard pin assembly 2 provided in the power converter. The British standard pin assembly 2 comprises a British standard shared slider 21 slidably provided in the power converter, and a British standard ground wire pin 22 provided on the British standard shared slider 21; the British standard shared slider 21 is integrally U-shaped, and an avoidance space 211 is formed therein; the European standard pin assembly 1 comprises a European standard shared slider 11 slidably provided in the avoidance space 211, and a European standard plug bush 12 matched with the European standard shared slider 11 and slidably provided in the avoidance space 211, wherein the European standard plug bush 12 is formed with a first European standard ground wire avoidance groove 121 recessed inwards and matched with the British standard ground wire pin 22; and the British standard ground wire pin 22 moves along the first British standard ground wire avoidance groove 121. By arranging the European standard pin assembly 1 to slide in the avoidance space 211 and moving the British standard ground wire pin 22 along the first British standard ground wire avoidance groove 121, the space occupied by the European standard pin assembly 1 and the space occupied by the British standard pin assembly 2 are overlapped, so that the space in the power converter is saved, the overall length of the power converter is reduced, and the overall volume of the power converter is reduced, which is more convenient for the user to carry it on the trip.

In order to further allow the British standard ground wire pin 22, as shown in FIGS. 1-4 and 6, a second British standard ground wire avoidance groove 111 is formed on the European standard shared slider 11, which is inwardly recessed and matched with the British standard ground wire pin 22. The British standard ground wire pin 22 moves on the first British standard ground wire avoidance groove 121 and the second British standard ground wire avoidance groove 111 in sequence, so that the space occupied by the British standard ground wire pin 22 coincides with the space occupied by the British standard ground wire avoidance groove 111 and the space occupied by the European standard shared slider 11, thereby further saving space in the power converter. The overall length of the power converter is reduced, the overall volume of the power converter is reduced, and it is more convenient for the user to carry it on the trip.

Preferably, in order to make the power converter more practical, as shown in FIGS. 1 to 6 and FIG. 8, the pin assembly structure of the power converter further includes an American standard pin assembly 3 slidably provided in the avoidance space 211. The American standard pin assembly 3 includes an American standard shared slider 31 slidably provided in the avoidance space 211, an American standard live wire pin 32 provided on the American standard shared slider 31, and an American standard neutral wire pin 33 provided on the American standard shared slider 31. By providing an American standard pin assembly 3 in the power converter, the selectivity of the pins which can be selected for use is further improved, and the practicality of the power converter is improved, which is beneficial to people’s travel. When people need to use the American standard pin assembly 3, it is only necessary to push out the American standard shared slider 31 towards the outside of the power converter. Thus, the American standard live wire pin 32 and the American standard neutral wire pin 33 are pushed out of the power converter, so as to realize the conversion of the American standard pin. The American standard pin assembly 3 moves in the avoidance space 211, so that the space occupied by the American standard pin assembly 3, the space occupied by the British standard pin assembly 2 and the space occupied by the European standard pin assembly 1 coincide, thereby reducing the overall length of the power converter and reducing the overall volume of the power converter, which is more convenient for the user to carry it on the trip.

With regard to the specific method for electrically connecting the American standard pin assembly 3 with the power converter, as shown in FIGS. 1-6 and 8, the American standard pin assembly 3 further comprises an American standard live wire conducting strip 34 provided on the American standard shared slider 31, protruding outwards and electrically connected to the American standard live wire pin 32, and an American standard neutral wire conducting strip 35 provided on the American standard shared slider 31, protruding outwards and electrically connected to the American standard neutral wire pin 33. When the American standard shared slider 31 drives the American standard live wire pin 32 and the American standard neutral wire pin 33 to be pushed out, the American standard live wire conducting strip 34 and the American standard neutral wire conducting strip 35 which are provided in the American standard shared slider 31 follow and move synchronously, so that the American live wire conducting strip 34 and the American standard neutral wire conducting strip 35 are inserted into a conduction mechanism in the power converter to realize a conduction and current connection between the European standard pin assembly 1 and the power converter. The whole process is conducted stably, and the conduction efficiency is improved.

With regard to the conduction mechanism in the power converter, the conduction mechanism may comprise a live wire conduction clamp and a neutral wire conduction clamp. Wen different pin assemblies are pushed out for use, the live wire conducting strip on the pin assembly is correspondingly inserted into the live wire conduction clamp, and the neutral wire conducting strip on the pin assembly is correspondingly inserted into the neutral wire conduction clamp to complete an electrical connection. The specific structure and operation mode of the conduction mechanism in the power converter are prior art in the art. For this reason, no specific limitation is made in the present embodiment, and the conduction mechanism can be set according to actual situations.

Preferably, in order to further save space in the power converter and facilitate the pushing-out and use of the American standard pin assembly 3, as shown in FIGS. 1-6 and 8, the British standard shared slider 21 is formed with an inwardly recessed American standard conducting strip avoidance groove 212, which allows the American standard live wire conducting strip 34 and the American standard neutral wire conducting strip 35 to move when driven by the American standard shared slider 31. The American standard live wire conducting strip 34 and the American standard neutral wire conducting strip 35 move up and down in the American standard conducting strip avoidance groove 212. Thus, the space occupied by the American standard live wire conducting strip 34 and the American standard neutral wire conducting strip 35 coincides with the space occupied by the British standard shared slider 21, further saving the space in the power converter, reducing the overall length of the power converter, reducing the overall volume of the power converter, which is more convenient for the user to carry it, and facilitates the use of the American standard pin assembly 3.

With regard to other structural arrangements of the British standard pin assembly 2, as shown in FIGS. 1-6 and 8, the British standard ground wire pin 22 is provided on one end of the U-shaped structure of the British standard shared slider 21; and the British standard pin assembly 2 further comprises a British standard neutral wire pin 24 provided on a side of the other end of the U-shaped structure of the British standard shared slider 21, and a British standard live wire pin 23 provided on the other side of the other end of the U-shaped structure of the British standard shared slider 21.

Figure 7:
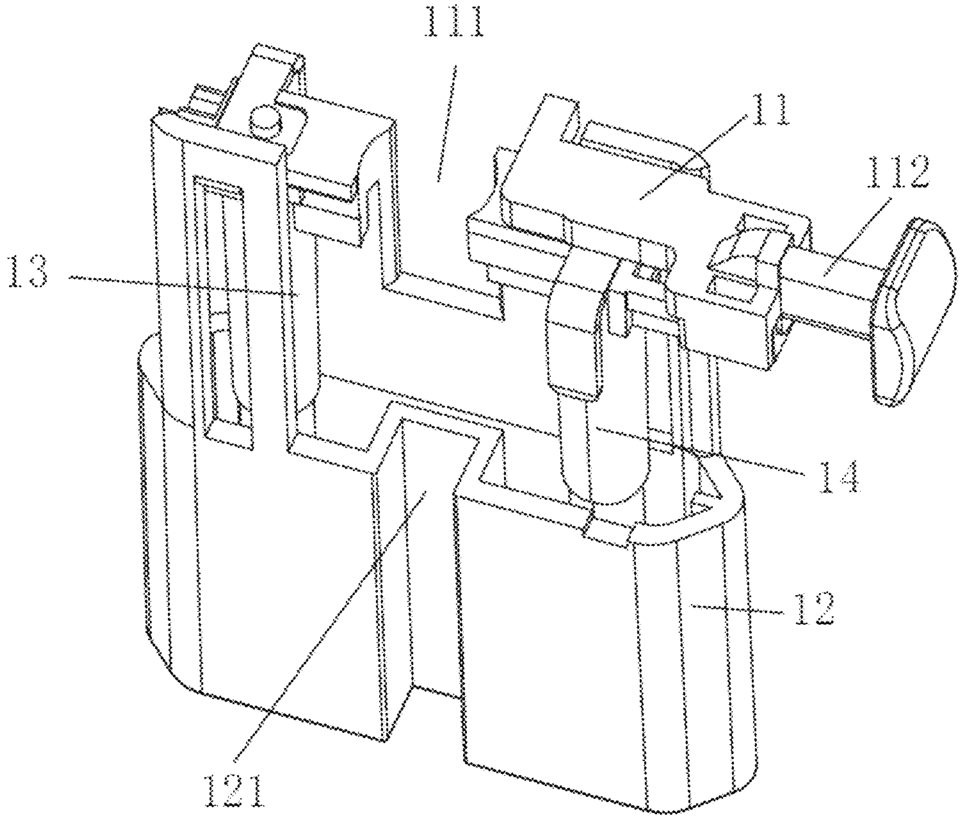
FIG. 7 is a structurally schematic view of a European standard pin assembly.
Figure 8:
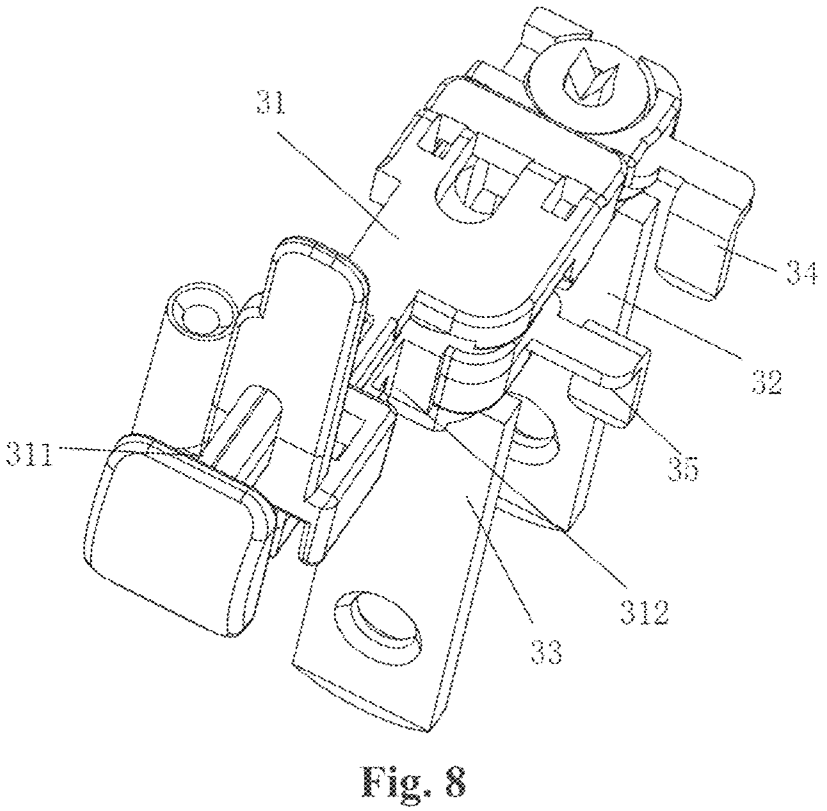
FIG. 8 is a structurally schematic view of an American standard pin assembly.

With regard to other structural arrangements of the European standard pin assembly 1, as shown in FIG. 7, the European standard pin assembly 1 further comprises a European standard live wire pin 13 provided on the European standard shared slider 11, and a European standard neutral wire pin 14 provided on the European standard shared slider 11. The British standard ground wire pin 22 is located in the middle of the European standard live wire pin 13 and European standard neutral wire pin 14, so as to make the space occupied by the European standard pin assembly 1 and the British standard pin assembly 2 coincide, reducing the overall length of the power converter, reducing the overall volume of the power converter, which is more convenient for a user to carry it on a trip.

For the specific way of pushing the British standard pin assembly 2 out of the power converter, as shown in FIGS. 1-5 and 6, the British standard pin operating rod 213 protruding outside the power converter is provided on the British standard shared slider 21. A user pushes the British standard pin operating rod 213 to push out the British standard shared slider 21 and structures such as a British standard live wire pin 23, a British standard neutral wire pin 24 and a British standard ground wire pin 22 provided on the British standard shared slider 21 from the power converter, which is simple and convenient to use.

For the specific way of pushing the American standard pin assembly 3 out of the power converter, as shown in FIGS. 1-5 and 8, the American standard pin operating rod 311 protruding outside the power converter is provided on the American standard shared slider 31. A user pushes the American standard pin operating rod 311 to push out the American standard shared slider 31 and structures such as an American standard live wire pin 32 and an American standard ground wire pin 33 provided on the American standard shared slider 31 from the power converter, which is simple and convenient to use.

For the specific way of pushing the British standard pin assembly 2 out of the power converter, as shown in FIGS. 1-4 and 7, the European standard pin operating rod 112 protruding outside the power converter is provided on the European standard shared slider 11. A user pushes the European standard pin operating rod 112 to push out the European standard shared slider 11 and structures such as a European standard live wire pin 13 and a European standard neutral wire pin 14 provided on the European standard shared slider 11 from the power converter, which is simple and convenient to use.

In order to allow the user to more accurately select different prong assemblies, as shown in FIGS. 1 to 8, the British standard pin operating rod 213, the American standard pin operating rod 311 and the European standard pin operating rod 112 are staggered, and the staggered configuration facilitates the user's selection of different pin assemblies for use, effectively avoiding a case where a plurality of operating rods are pressed at once.

Figure 2:
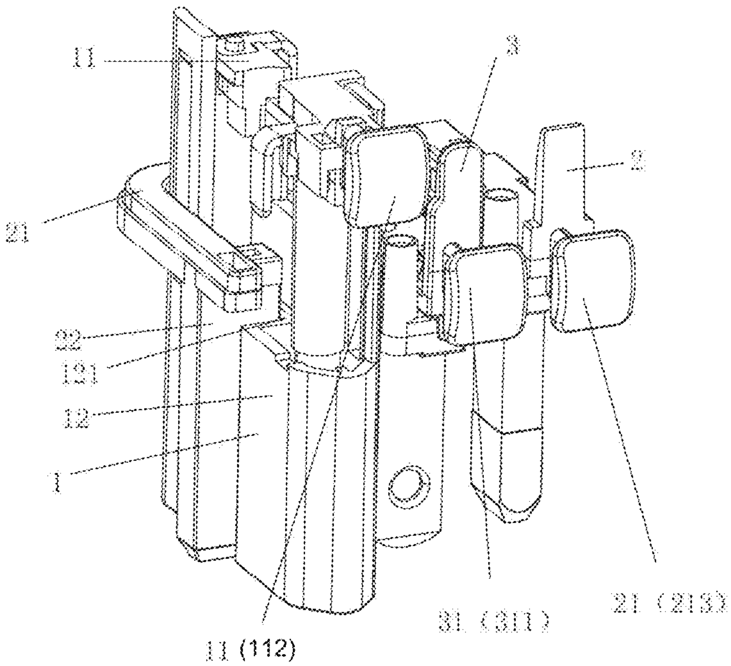
FIG. 2 is a structurally schematic view of a European standard pin assembly, an American standard pin assembly and a British standard pin assembly.
Figure 3:
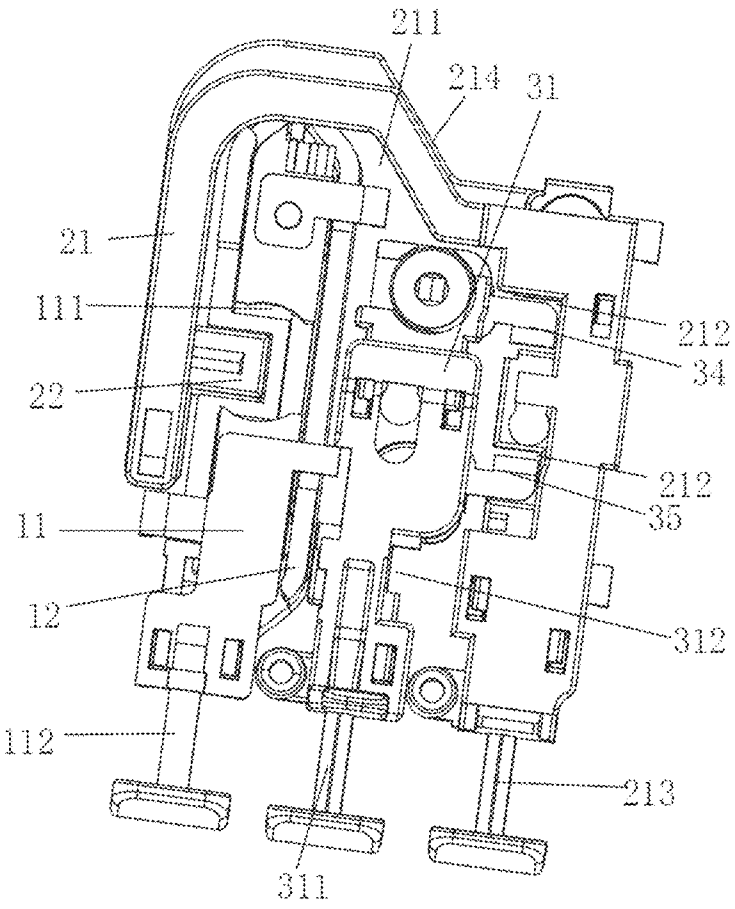
FIG. 3 is a top view of a European standard pin assembly, an American standard pin assembly, and a British standard pin assembly.
Figure 4:
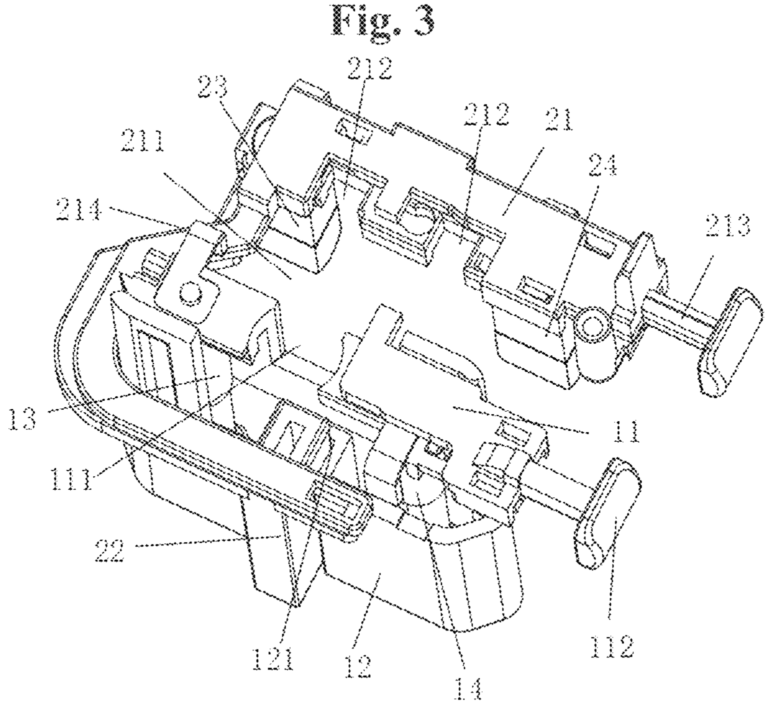
FIG. 4 is a structurally schematic view of a British standard pin assembly and a European standard pin assembly.
Figure 5:
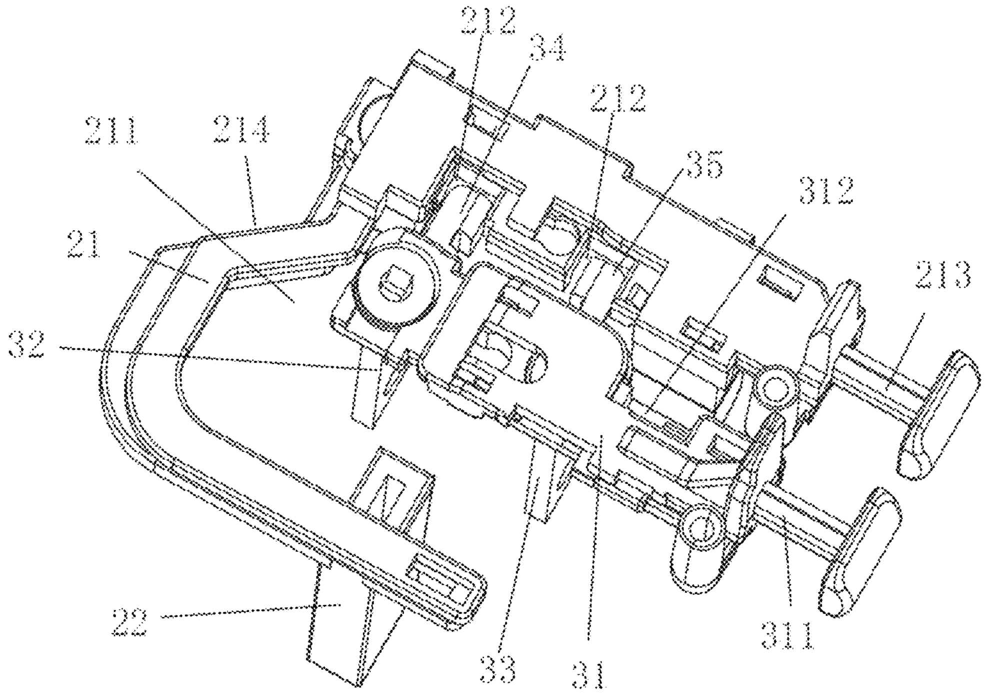
FIG. 5 is a structurally schematic view of a British standard pin assembly and an American standard pin assembly.
Figure 6:
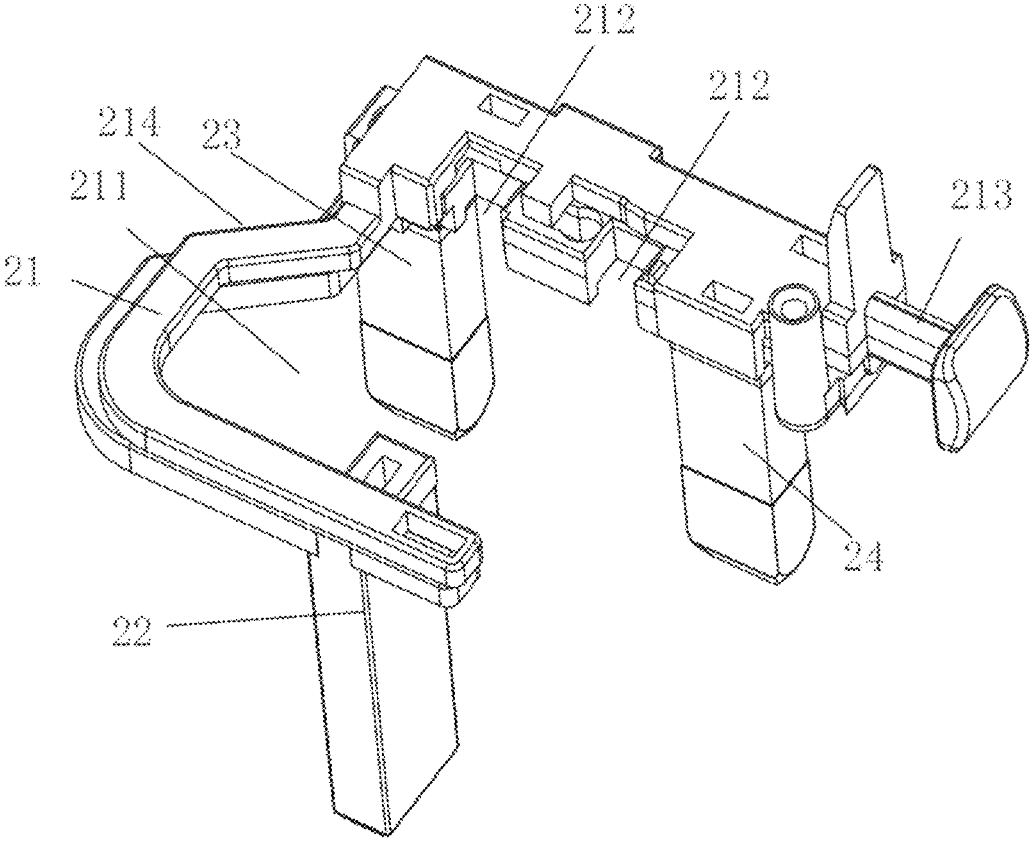
FIG. 6 is a structurally schematic view of a British standard pin assembly.

Preferably, as shown in FIGS. 1 to 2, the initial height of the European standard pin operating rod 112 is higher than the initial height of the British standard pin operating rod 213 and the American standard pin operating rod 311, thereby forming a staggered arrangement, effectively avoiding a case where a plurality of operating rods are pressed at once.

Figure 9:
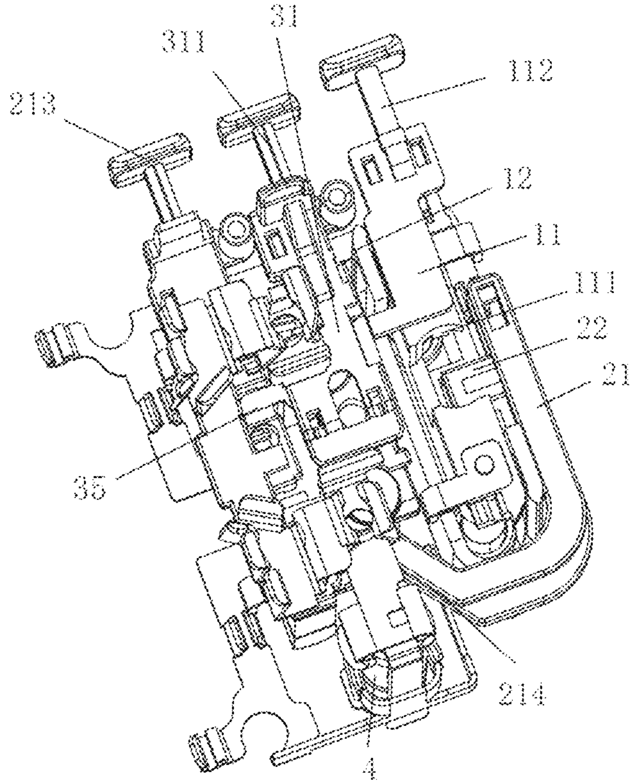
FIG. 9 is a top view of a safety member, a socket neutral wire conducting strip, a European standard pin assembly, an American standard pin assembly, and a British standard pin assembly.
Figure 10:
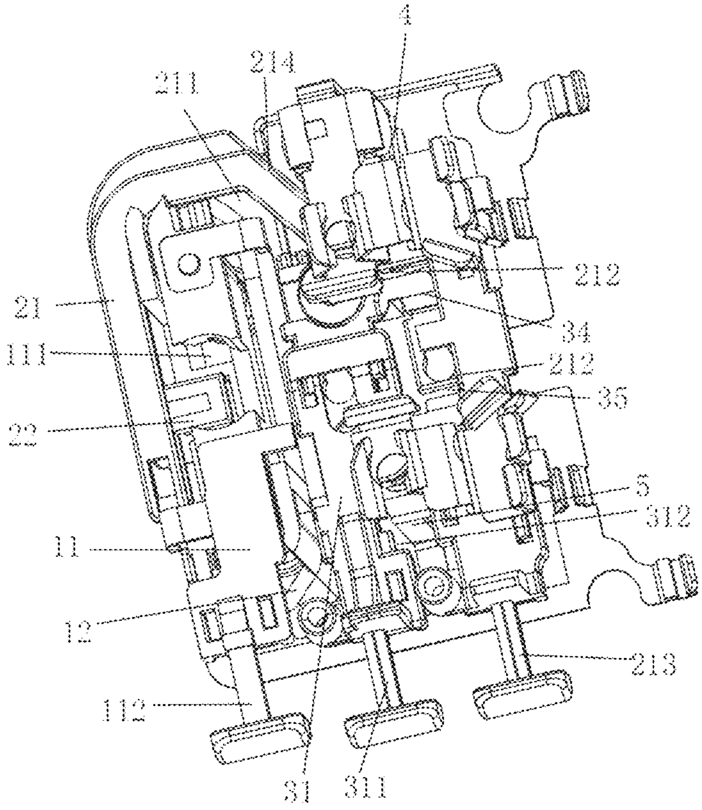
FIG. 10 is another top view of the safety member, the socket neutral wire conducting strip, the European standard pin assembly, the American standard pin assembly, and the British standard pin assembly.
Figure 11:
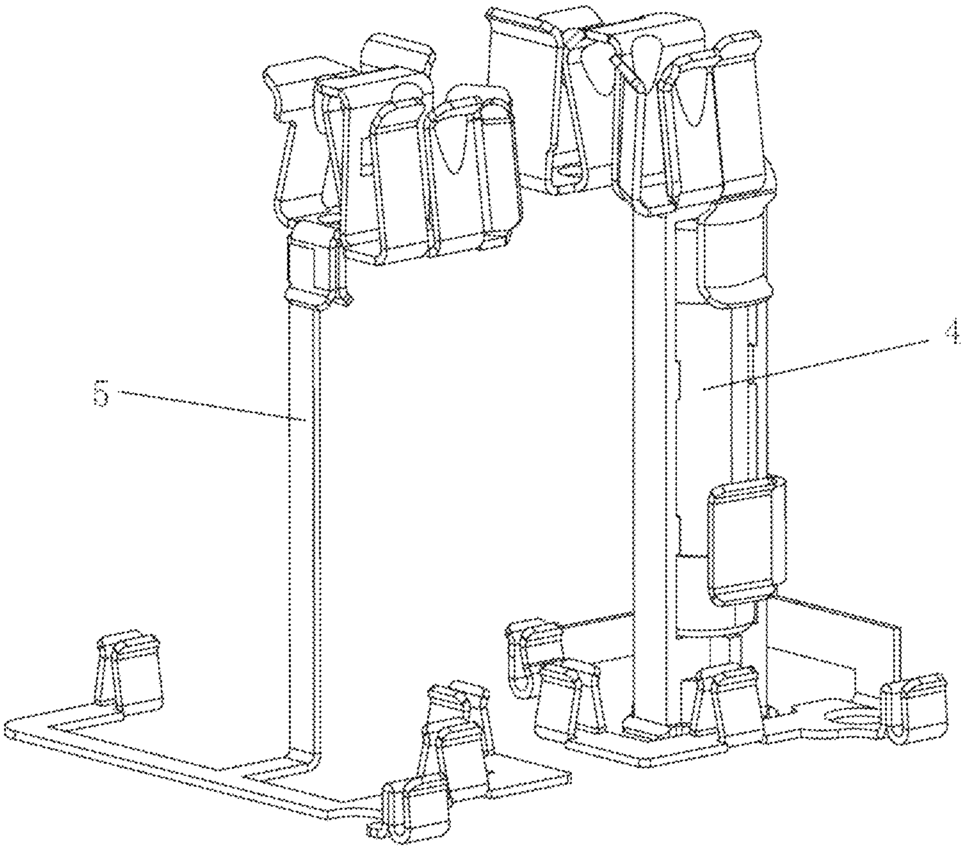
FIG. 11 is a structurally schematic view of the safety member and the socket neutral wire conducting strip.

In order to improve the safety of the power converter, as shown in FIGS. 9-11, the pin assembly structure of the power converter further comprises a safety member 4 provided in the power converter, wherein the safety member 4 communicates with the conducting structure in the power converter, so as to protect the circuit of the power converter and effectively improve the safety of the power converter.

In order to further save the space in the power converter, as shown in FIGS. 9 and 10, the British standard shared slider 21 is formed with a British standard safety avoidance portion 214 which is recessed in the direction of the avoidance space 211 and yields the safety member 4, so that the space occupied by the safety member 4 coincides with the space occupied by the British standard pin assembly 2, thereby further saving the space in the power converter, reducing the overall length of the power converter and reducing the overall volume of the power converter. It is more convenient for the user to carry it on the trip.

Preferably, as shown in FIGS. 3-6 and 9-10, the British standard safety avoidance portion 214 is inclined so that it provides more room for the British standard safety avoidance portion 214 to be installed and used.

With regard to the specific structural arrangement of the safety member 4, the safety member 4 may be a safety tube, a fuse, a fuse, etc. which may be arranged according to actual situations, and therefore is not particularly limited in the present embodiment.

With regard to the specific structure of the conduction assembly in the power converter, as shown in FIGS. 9-11, the pin combination structure of the power converter further comprises a socket neutral wire conducting strip 5 provided in the power converter, and the socket neutral wire conducting strip 5 can be connected to any one of the American standard neutral wire pin 33, the British standard neutral wire pin 24 and the European standard neutral wire pin 14 alone, so as to realize the neutral wire conduction of the American standard pin assembly 3, the neutral wire conduction of the British standard pin assembly 2 or the neutral wire conduction of the European standard pin assembly 1. The structure of the socket neutral wire conducting strip 5 can be set according to actual situations, and therefore the specific structure thereon is not particularly limited in the present embodiment. The power converter can also be provided with a socket live wire conducting strip for conducting the British standard pin assembly 2, the American standard pin assembly 3 and the European standard pin assembly 1. The safety member 4 is connected to the socket live wire conducting strip for protecting a circuit. The structure of the socket live wire conducting strip can be set according to actual situations, and therefore the specific structure thereon is not particularly limited in this embodiment.

Preferably, as shown in FIGS. 3, 5, 8 and 9-11, the American standard shared slider 31 is formed with an American standard conductive avoidance portion 312 which is inwardly recessed and provides a relief for the socket neutral wire conducting strip 5, so that the space occupied by the socket neutral wire conducting strip 5 coincides with the space occupied by the American standard pin assembly 3, thereby further saving the space in the power converter, reducing the overall length of the power converter, and reducing the overall volume of the power converter. It is more convenient for a user to carry it on the trip.

It should be noted that the pin combined structure for the power converter with the smaller volume disclosed in the present invention is an improvement to the specific structure, and it is not an innovative point of the present invention for the specific control mode. The American standard live wire pin, the American standard neutral wire pin, the British standard neutral wire pin, the British standard live wire pin, the British standard ground wire pin, the European standard live wire pin, the European standard neutral wire pin and other components involved in the present invention can be common standard components or components known to a person skilled in the art. The structure, principle and control method thereof are all known to a person skilled in the art by a technical manual or by conventional experimental methods.

The above-mentioned features are merely preferred embodiments of the present invention and do not limit the technical scope of the present invention. Therefore, other structures obtained by adopting the same or similar technical features as the above-mentioned embodiments of the present invention are all within the scope of protection of the present invention.

The invention claimed is:

1. A pin combined structure for a power converter, comprising:

a European standard pin assembly, and a British standard pin assembly provided in the power converter, wherein the British standard pin assembly comprises a British standard shared slider slidably provided in the power converter, and a British standard ground wire pin provided on the British standard shared slider; the British standard shared slider is integrally U-shaped, and an avoidance space is formed in the British standard shared slider;

the European standard pin assembly comprises a European standard shared slider slidably provided in the avoidance space, and a European standard plug bush matched with the European standard shared slider and slidably provided in the avoidance space, wherein the European standard plug bush is formed with a first European standard ground wire avoidance groove recessed inwards and matched with the British standard ground wire pin; and the British standard ground wire pin moves along the first European standard ground wire avoidance groove;

the pin combined structure further comprises an American standard pin assembly provided in the avoidance space; wherein the American standard pin assembly comprises an American standard shared slider slidably provided in the avoidance space, an American standard live wire pin provided on the American standard shared slider, and an American standard neutral wire pin provided on the American standard shared slider;

wherein the American standard pin assembly further comprises an American standard live wire conducting strip provided on the American standard shared slider, protruding outwards and electrically connected to the American standard live wire pin, and an American standard neutral wire conducting strip provided on the American standard shared slider, protruding outwards and electrically connected to the American standard neutral wire pin; the British standard shared slider is formed with an inwardly recessed American standard conducting strip avoidance groove, which allows the American standard live wire conducting strip and the American standard neutral wire conducting strip to move when driven by the American standard shared slider.

2. A pin combined structure for a power converter, comprising:

a European standard pin assembly, and a British standard pin assembly provided in the power converter, wherein the British standard pin assembly comprises a British standard shared slider slidably provided in the power converter, and a British standard ground wire pin provided on the British standard shared slider; the British standard shared slider is integrally U-shaped, and an avoidance space is formed in the British standard shared slider;

the European standard pin assembly comprises a European standard shared slider slidably provided in the avoidance space, and a European standard plug bush matched with the European standard shared slider and slidably provided in the avoidance space, wherein the European standard plug bush is formed with a first European standard ground wire avoidance groove recessed inwards and matched with the British standard ground wire pin; and the British standard ground wire pin moves along the first European standard ground wire avoidance groove;

the pin combined structure further comprises a safety member provided in the power converter; wherein a British standard safety avoidance portion that is recessed towards the avoidance space and that yields the safety member is formed on the British standard shared slider.

3. A pin combined structure for a power converter, comprising:

a European standard pin assembly, and a British standard pin assembly provided in the power converter, wherein the British standard pin assembly comprises a British standard shared slider slidably provided in the power converter, and a British standard ground wire pin provided on the British standard shared slider; the British standard shared slider is integrally U-shaped, and an avoidance space is formed in the British standard shared slider;

the European standard pin assembly comprises a European standard shared slider slidably provided in the avoidance space, and a European standard plug bush matched with the European standard shared slider and slidably provided in the avoidance space, wherein the European standard plug bush is formed with a first European standard ground wire avoidance groove recessed inwards and matched with the British standard ground wire pin; and the British standard ground wire pin moves along the first European standard ground wire avoidance groove;

the pin combined structure further comprises an American standard pin assembly provided in the avoidance space; wherein the American standard pin assembly comprises an American standard shared slider slidably provided in the avoidance space, an American standard live wire pin provided on the American standard shared slider, and an American standard neutral wire pin provided on the American standard shared slider;

the pin combined structure further comprises a socket neutral wire conducting strip provided in the power converter, wherein an American standard conductive avoidance portion which is inwardly recessed and provides a relief for the socket neutral wire conducting strip is formed on the American standard shared slider.

* * * * *